United States Patent [19]

Itzov

[11] Patent Number: 5,265,511
[45] Date of Patent: Nov. 30, 1993

[54] CONTROLLED AXIAL POSITION HINGE ASSEMBLY

[75] Inventor: Andrew L. Itzov, Menomonee Falls, Wis.

[73] Assignee: Milwaukee Electric Tool Corporation, Brookfield, Wis.

[21] Appl. No.: 930,004

[22] Filed: Aug. 13, 1992

[51] Int. Cl.[5] ............................ B27B 5/20; B27B 5/29
[52] U.S. Cl. ...................................... 83/490; 16/257; 16/280; 16/381; 16/386; 83/698; 403/149; 403/154; 403/157
[58] Field of Search ............... 403/149, 154, 155, 159; 83/490, 698; 16/251, 280, 381, 386

[56] References Cited

U.S. PATENT DOCUMENTS

| | | | |
|---|---|---|---|
| 1,540,842 | 6/1925 | Kaetker | 83/490 |
| 3,706,332 | 12/1972 | George | 143/159 |
| 4,491,436 | 1/1985 | Easton | 403/154 |
| 4,581,966 | 4/1986 | Kaiser et al. | 83/397 |
| 4,597,499 | 7/1986 | Hanula | 403/154 |
| 4,774,866 | 10/1988 | Dehari et al. | 83/478 |
| 4,934,233 | 6/1990 | Brundage et al. | 83/397 |

Primary Examiner—Hien H. Phan
Attorney, Agent, or Firm—Michael, Best & Friedrich

[57] ABSTRACT

A pivot assembly for mounting an operating member on a base member for pivotal movement about an axis at an optimum axial position comprising: a pivot shaft having an axis, a base member and an operating member having axially opposable first and second inner surfaces respectively, a first mounting apparatus for mounting one of the members at a fixed axial position on the pivot shaft, and a second mounting apparatus for mounting the other member on the pivot shaft for relative rotational movement, and for axial movement to a position where the first and second inner surfaces axially oppose each other with an axial space therebetween, and the other member is at the optimum axial position. The second mounting apparatus includes, a pair of compressible disk springs mounted to be in a biased condition when the other member is at the optimum axial position. The disk springs constantly tend to move the other member in one axial direction away from the optimum position. The second mounting apparatus also includes a stop which prevents movement of the other member relative to the pivot shaft in the one axial direction from the optimum position and maintains the disk springs in the biased condition thereby preventing movement of the other member from the optimum position due to wear induced axial dimensional changes.

16 Claims, 2 Drawing Sheets

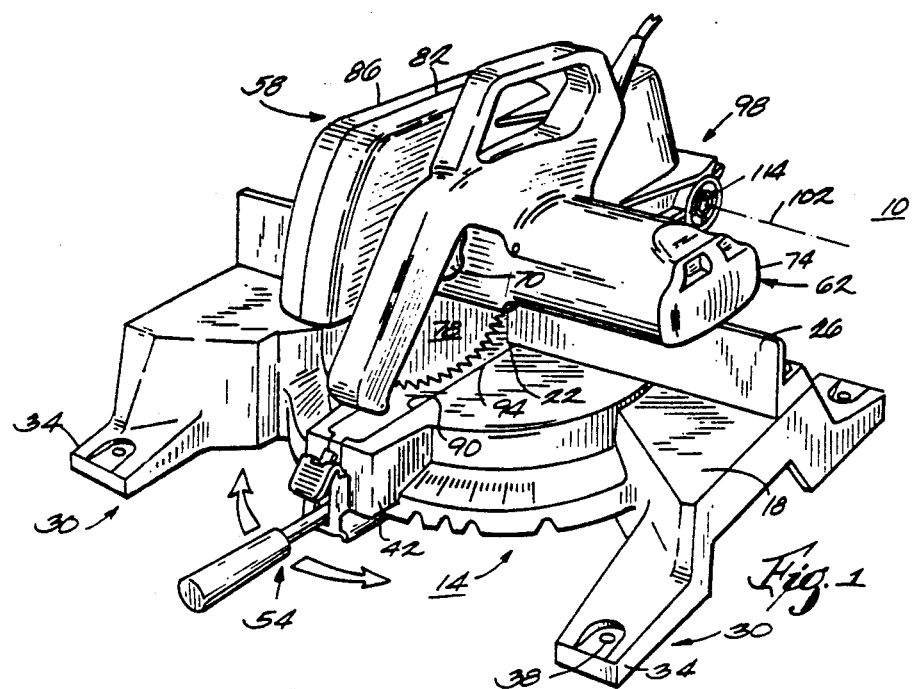
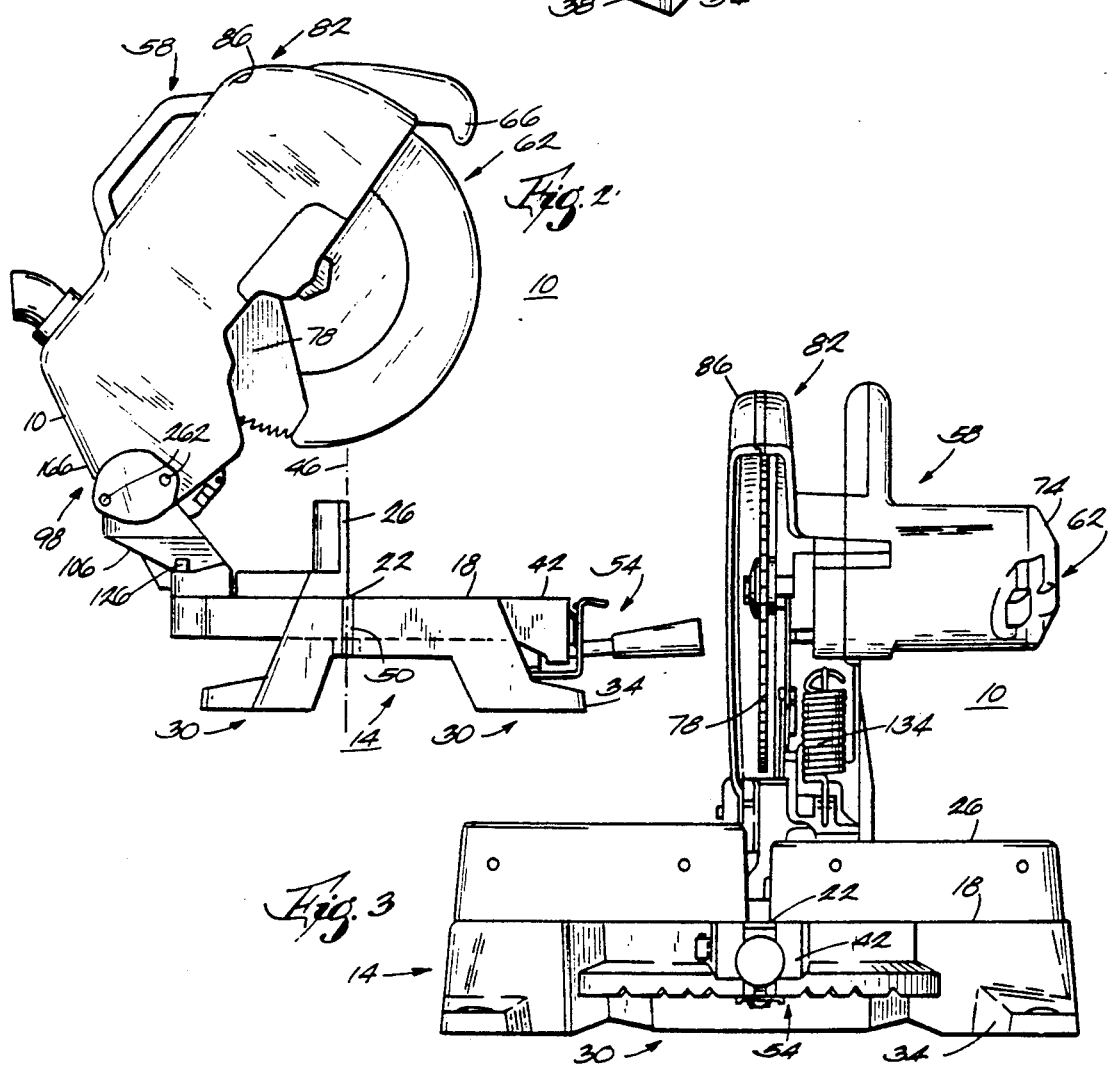

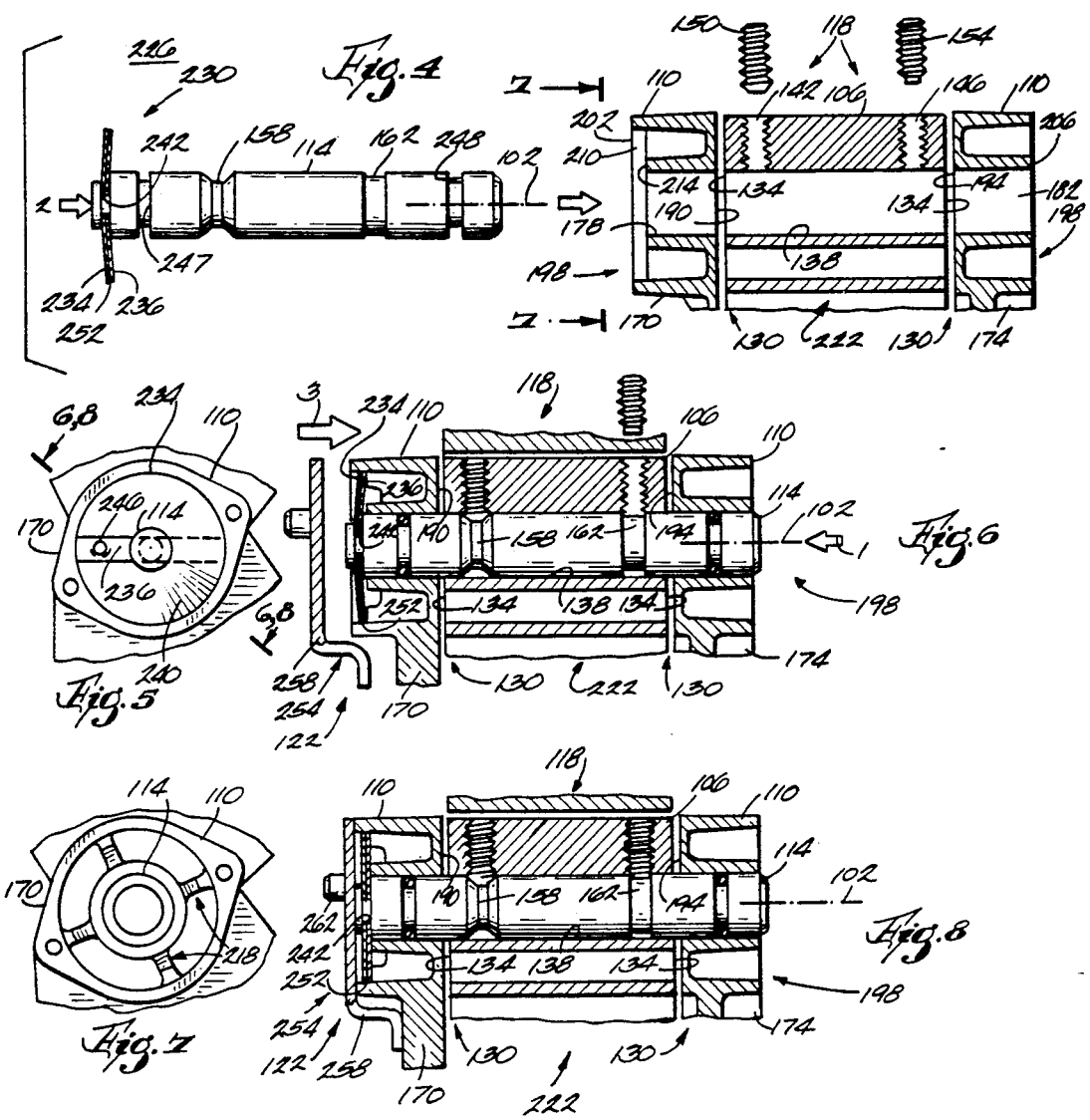
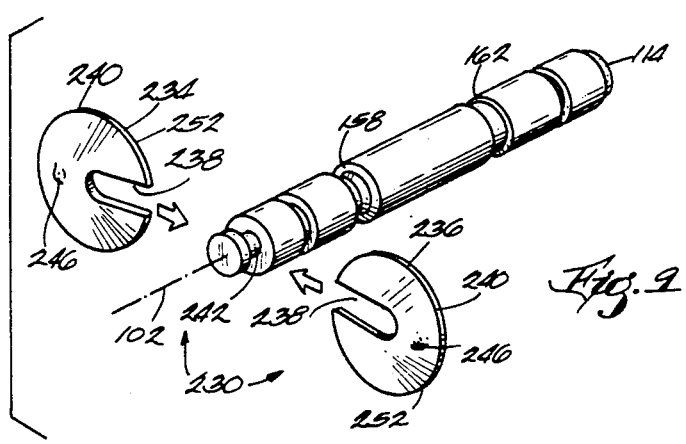

CONTROLLED AXIAL POSITION HINGE ASSEMBLY

BACKGROUND OF THE INVENTION

The invention relates to a power miter saw for use in carpentry and other cutting crafts. More particularly, the invention relates to a pivot assembly for mounting a cutting unit for movement about an axis from a cutting position to a raised, non-cutting position to provide for zero axial movement or play of the cutting unit.

Power miter saws have been used as a quick and efficient way of making angular cuts in a work piece, usually a portion of a chair rail, base board, crown molding or aluminum siding. Typically, the power miter saw consists of a base having a turntable mounted thereon for rotational movement and a cutting unit mounted on the turntable for movement from a cutting position to a non-cutting position.

The turntable is usually metal and typically includes a slot through which the saw blade extends during cutting action. This slot is usually covered by a plastic or particle board cut-through kerf plate which, when the saw is first used, must be cut through to create a saw blade receiving slot in the turntable, referred to in the trade as a kerf. The purpose of the cut-through kerf plate is to provide support for the workpiece which is as close as possible to the saw blade so as to prevent the bottom of the workpiece from splintering and chipping during cutting. This phenomenon is commonly called bottom chip-out.

When cutting expensive plywoods of rare veneer or finished or costly hardwood lumber such chip-out can result in the finished cut piece becoming scrap resulting in excessive costs due to the material loss and the time the craftsmen must spend duplicating the scrapped piece. To provide a kerf in the kerf plate that is as close as possible to the sides of the blade, it is normal practice to assemble the miter saw, install the saw blade, turn the saw on and then lower the rotating blade through the uncut kerf plate to create a close tolerance kerf therein. The edges of the kerf are then as close as possible to the saw blade and provide excellent support to the workpiece when the saw is new. Unfortunately, axial wear which occurs during use of the saw allows the saw blade to shift axially which cuts the kerf wider. This soon destroys the close tolerance kerf and creates chip-out problems for the craftsman as will now be explained.

Additionally, the play created by the axial wear of the pivot assembly will compromise the axial precision of the saw blade as the cutting unit moves from the non-cutting position to the cutting position and through the workpiece. The increased play will result in a diminished accuracy of the cut in the workpiece.

The usual cutting unit pivot assembly is some form of a hinge which has a single boss or a pair of bosses mounted on the base in spaced relation, each of the bosses having a bore extending longitudinally along a common axis. The cutting unit typically includes a mounting member having a projecting tongue or shank which also has a bore extending longitudinally therethrough. The projecting shank is dimensioned to fit in the space between the bosses extending from the base, so that a pivot pin or shaft can fit through the aligned bores to connect the cutting unit mounting member and the base for pivotal movement relative to each other about a generally horizontal axis defined by the pivot pin.

In order to make controlled and precise miter cuts, and to prevent the saw blade from moving axially and enlarging the width of the kerf in the kerf plate, it is generally desirable that the hinge provide for only precise vertical movement of the cutting unit. That is, in moving from the non-cutting position to the cutting position, and vice versa, the cutting unit should not experience any axial movement relative to the base. In order to achieve this result, it has been necessary to manufacture the components of the hinge using parts which are first cast and then machined. This two-step process is expensive and is even made more so because of the exact tolerances which must be adhered to in machining the castings.

If exact tolerances are not maintained, there will be axial play in the hinge resulting in the saw blade engaging the kerf plate at varying axial positions. The axial inconsistency of the cutting action will cause accelerated wear in the width of the kerf in the kerf plate and result in loss of the close tolerance kerf necessary to prevent chip-out. Frequent replacement of the kerf plate will not solve this problem because axial play will destroy the close tolerance kerf in the new kerf plate.

Furthermore even if exact tolerances are maintained during manufacture, conventional hinge arrangements will over time, develop chip-out problems. Regular use of the saw causes wear in the hinge apparatus. Over a period of time, this wear will reduce the axial precision of the hinge assembly allowing the blade to shift axially, and the necessary close tolerance fit between the kerf and blade will be lost resulting in chip-out occurring. Prior miter saw designs do not solve the problem of chip-out resulting from wear induced axial play that widens the kerf in the kerf plate.

In summary, the problem that exists is how to provide a miter saw cutting unit hinge assembly which can be manufactured using relatively inexpensive and easily made parts, for example casting used in an as-cast, non-machined condition, and which has the ability to accommodate normal axial wear of the hinge components so that the precise axial position of the saw blade is maintained throughout the normal operating life of the miter saw to minimize widening of the kerf in the kerf plate.

Attention is directed to the following U.S. patents:
U.S. Pat. No. 4,934,233, Brundage et al., Jun. 19, 1990
U.S. Pat. No. 4,774,866, Dehari et al., Oct. 4, 1988
U.S. Pat. No. 4,581,966, Kaiser et al., Apr. 15, 1986
U.S. Pat. No. 3,706,332, George, Dec. 19, 1972

These patents generally show the state of the art in miter or chop saw hinge mounting assemblies. The references generally show that it is known in the art to mount the cutting unit using a hinge which allows for rotation of the cutting unit about a horizontal axis defined by a pivot pin for movement between a cutting and non-cutting position. However, the cited patents do not teach or disclose an apparatus using inexpensive and easily manufactured components and which has the added capability of being able to accommodate axial wear of the components of the hinge to substantially prevent axial deviation of the saw blade from the kerf made in the kerf plate when the miter saw was new.

SUMMARY OF THE INVENTION

The invention provides a pivot assembly for mounting an operating member on a base member for pivotal movement between first and second positions. The pivot assembly includes a pivot shaft having an axis, a base member, and an operating member such as a cutting unit having axially opposed first and second inner surface means respectively. The invention includes a first mounting apparatus for mounting one of the members at a fixed axial position on the pivot shaft, and a second mounting apparatus for mounting the other member, such as a cutting unit, on the pivot shaft for relative rotational movement. The second mounting apparatus provides for axial movement to a position where the first and second inner surfaces are axially opposed to each other with an axial space therebetween, such that the other member is at an optimum axial position with respect to the first and second inner surfaces. This, for example, will allow a saw blade on the cutting unit to be located at a precise optimum position. The second mounting apparatus also includes a pair of disk springs mounted to be in a biased condition when the other member is at the optimum axial position. The disk springs constantly force the other member in one axial direction away from the optimum position. The second mounting apparatus also provides a stop member preventing movement of the other member relative to the pivot shaft in the one axial direction from the optimum position and maintaining the disk springs in the biased condition thereby preventing wear induced movement of the other member from the optimum position in an axial direction opposite to the one axial direction.

The pivot assembly of the preferred embodiment is an improvement over prior art hinge assemblies in that it provides a biasing means, in the form of a pair of disk springs, that operates to draw the pivot pin to a fixed axial position when the stop member is mounted on the hinge assembly. Wear between the hinge components is minimized because of the spaced relation of the base member and operating member surfaces. Further, the fact that the disk springs are biased to a condition of intermediate axial length, allows the biasing means to adjust its axial length to accommodate for wear which will occur between the disk springs and the pivot pin. Further, the spaced relation between the base member and operating member surfaces allows the parts to be used in an as-cast condition eliminating the need to engage in the expensive process of machining the castings because precise manufacturing tolerances are unnecessary in the preferred embodiment.

BRIEF DESCRIPTION OF THE DRAWINGS

FIG. 1 is a perspective view of the miter saw showing the cutting unit in the cutting position.

FIG. 2 is a side elevational view of the miter saw showing the cutting unit in the non-cutting position.

FIG. 3 is a front elevational view of the miter saw showing the cutting unit in the non-cutting position.

FIG. 4 is an exploded view of the functional elements of the hinge assembly.

FIG. 5 is a partial side elevational view of the hinge assembly with the cover or stop member removed.

FIG. 6 is a cross-sectional view of the hinge assembly taken along the line 6—6 in FIG. 5 showing the stop member removed.

FIG. 7 is a partial side elevational view of the hinge assembly taken along line 7—7 in FIG. 4.

FIG. 8 is a cross-sectional view of the hinge assembly taken along the line 8—8 in FIG. 5 but showing the cover or stop member mounted on the hinge assembly.

FIG. 9 is an exploded view showing the pivot shaft and compressible disk springs of the hinge assembly.

DETAILED DESCRIPTION OF THE PREFERRED EMBODIMENT

FIGS. 1, 2, and 3 generally illustrate the miter saw 10 having the controlled axial position hinge assembly embodying the invention. The miter saw 10 generally includes a base 14 having a workpiece support surface 18, and a cutting station 22 at which the workpiece (not shown) is cut. The cutting station 22 includes a fence 26 bolted to the workpiece support surface 18 to provide a support against which the workpiece can be held during the cutting process. The base 14 also includes a stable means of support 30 comprising four widely spaced feet 34 each including a bore 38 which could accommodate a bolt (not shown) for securing the saw unit 10 to a work bench or table (not shown).

The base 14 also includes a turntable 42 mounted thereon for rotational movement about a vertical axis 46 extending longitudinally along a turntable pivot shaft 50 (FIG. 2). A detent locking means 54 is provided to secure the turntable 42 in a specified position of rotation about the vertical axis 46 and relative to the base 14. The turntable 42 may simply rest unsecured in the base, or alternatively, the turntable may include a bolt or nut means (not shown) to secure the turntable to the base for rotation about the vertical axis 46. In arrangements where the turntable 42 is not secured to the base 14 by other means, the workpiece fence 26 also operates to hold the turntable in place on the base.

Also as shown in FIGS. 1, 2, and 3, is a cutting unit 58 mounted on the turntable 42 and including a motorized circular saw 62 having a pull arm or actuating handle 66 with a trigger switch 70, a motor 74, a saw blade 78 driven by the motor, and a cutting unit housing 82 which includes a removable cover 86.

The turntable 42 also includes a slot 90 covered by a kerf plate 94 (hereinafter "kerf plate") which lends support to the workpiece. When the miter saw 10 is used for the first time, an initial cut must be made through the kerf plate 94. This is accomplished simply by lowering the cutting unit 58 to the cutting position (shown in FIG. 1) with the circular saw 62 on so that the saw blade 78 contacts and makes an initial cut in the kerf plate 94. The initial cut forms a receiving slot (not shown) for the saw blade 78 and provides axial support to the saw blade and bottom support for the workpiece to guard against bottom chip-out.

The cutting unit 58 also includes a mounting means or controlled axial position hinge assembly 98, best shown in FIG. 2, for securing the cutting unit on the turntable 42 to rotate therewith and to accommodate movement relative to the turntable 42 from a non-cutting position (shown in FIG. 2) to a cutting position (shown in FIG. 1). Thus, the cutting unit 58 is provided with two relative planes of motion: the first being rotation about a generally horizontal axis 102 defined by the mounting means or hinge assembly 98, and the second being rotation about the generally vertical axis 46 relative to base 14.

As shown in FIG. 2, the zero axial clearance hinge assembly 98 of the preferred embodiment includes a base member 106 mounted on the turntable 42, an operating member 110 which preferably includes the cutting unit 58, a pivot pin or shaft 114 defining the axis 102, a first mounting means 118 (FIG. 4) for mounting the operating member 110 on the pivot shaft 114 at a fixed axial position, and a second mounting means 122 for mounting the other member 106, on the pivot shaft 114 to provide for rotational movement of the cutting unit 58 about the axis 102 of the pivot shaft 114 from a non-cutting position to a cutting position and vice versa. The hinge assembly 98 will now be described in more detail.

Referring still to FIG. 2, the base member 106 of the hinge assembly 98 is mounted on the turntable 42 for rotation therewith about the generally vertical axis 46 of the turntable pivot shaft. The base member 106 is mounted on the turntable 42 using a pair or triplet of bolts 126 (only one of which is shown in FIG. 2). Referring now to FIGS. 4, 6 and 8, the base member 106 includes first inner surface means 130. The first inner surface means 130 is a pair of spaced apart first surfaces 134 that face outwardly and together define the outer dimension of the base member 106.

Continuing to refer to FIGS. 4-8, first mounting means 118 of the preferred embodiment includes a generally horizontally extending through bore 138 in the base member 106 for receiving the pivot shaft 114 therein. The through bore 138 extends between and connects oppositely facing first surfaces 134. First mounting means 118 further includes a pair of threaded bores 142 and 146 (FIG. 4) extending into the base member 106 in a direction which is perpendicular to the pivot shaft receiving bore 138 in the base member 106. The threaded bores 142, 146 communicate with the pivot shaft receiving bore 138 so as to receive or accommodate a pair of set screws 150, 154 that are, when installed as shown in FIG. 8, in contact with the pivot shaft 114. The set screws 150, 154 are threaded and dimensioned to fit inside the set screw bores 142, 146 respectively and operate to secure the base member 106 at a fixed axial position relative to the pivot shaft 114. The pivot shaft 114 has annular grooves 158, 162 at appropriate axial positions for receiving the ends of set screws 150, 154 of the first mounting means 118 causing the base member 106 and the pivot shaft 114 to be fixed in an axial position relative to each other when the set screws 150, 154 are tightened into contact with the pivot shaft 114. As shown in FIGS. 6 and 8, one of the annular grooves 158 is bevelled to allow placement of set screw 150 in set screw bore 142 to draw the pivot shaft from a position which is nearly optimum relative to the base member 106 to a position that is optimum relative to the base member 106.

The operating member 110 of the preferred embodiment is a portion of the cutting unit 58, and includes a bifurcated end portion 166 (FIG. 2) which has spaced apart pivot shaft support portions 170, 174 adapted to receive the pivot shaft 114. The pivot shaft support portions 170, 174 (FIGS. 4-8) define axially spaced aligned bores 178, 182 (FIG. 4) in which the pivot shaft 114 could be rotatably mounted. The operating member 110 also includes axially opposed second inner surface means 186 (FIG. 4), which are second inner surfaces 190, 194 on each pivot shaft support portion 170, 174, and outwardly facing outer surface means 198 defining the outer axial boundaries 202, 206 (FIG. 4) of the operating member pivot shaft support portions 170, 174. At least one of the outer boundaries 202, 206 includes an annular recess 210 (FIG. 4) having a recessed surface 214. In the preferred form of the invention, the annular recess 210 includes radially extending ribbed support members 218 (FIG. 7), the function of which will be explained below. The operating member bores 178, 182 extend between the corresponding second inner and outer surface means 186, 198 of the pivot shaft support portions 170, 174.

The axial displacement of the second inner surfaces 190, 194 provides a base member receiving gap 222. The base member 106 is dimensioned to fit in the base member receiving gap 222 so that the pivot shaft bores of the base member and operating member, 138 and 178, 182, respectively, align to allow the pivot shaft 114 to be rotatably mounted therein. In the embodiment shown, and as will be explained below, the members 106 and 110 are mounted such that each of the outwardly facing first base member surfaces 134 are axially spaced from the opposing operating member second surfaces 190, 194. The axial distance between the respective surfaces is sufficient to prevent any contact during relative rotation of the base and operating members 106 and 110 respectively. Furthermore, the axial space between the opposing surfaces obviates the need to use machined parts or machined surfaces which have or require precise manufacturing tolerances.

The hinge assembly 98 of the preferred embodiment also provides second mounting means 122 for mounting the operating member 110 on the pivot shaft 114 for both relative rotational movement about the pivot shaft axis 102 and for axial movement to a position where the base member inner surfaces 134 axially oppose the operating member inner surface 190, 194 with an axial space therebetween so that the operating member 110 is at an optimum axial position. As previously stated, the optimum position of the operating member is one which allows an axial space between the base member inner surfaces and the operating member inner surfaces of sufficient dimension to obviate the need for machined parts.

In order to secure the operating member 110 in the stated optimum position, second mounting means 122 includes a biasing means 226 (FIG. 4) for providing an axial biasing force between the pivot shaft 114 and the operating member 110. In the preferred embodiment, the biasing means includes a compressible disk spring means 230 in the form of a pair of concave disk springs 234, 236 that are nestable within each other and that have a given length. The disk springs 234, 236 are compressible along their axial length thereby allowing adjustment of the disk spring axial length. The disk springs each include a circular body portion 240 having a radial slot 238 opposed to the body portion 240 which allows the springs 234, 236 to be slide mounted into an annular receiving groove 242 (FIG. 9) on the pivot shaft 114. In this fashion, the disk springs 234, 236 are axially fixed in a position relative to the pivot shaft 114 and at a predetermined position on the pivot shaft 114. The disk springs 234, 236 reside on the pivot shaft 114 so that one 236 is axially disposed between the bifurcated end portion recessed surfaces 214 and the other disk spring 234. Furthermore, the disk springs 234, 236 are aligned so that radial slots 238 are in opposing relation. Although not necessary, the springs 234, 236 of the preferred embodiment also include a raised orientating projection 246 on the body portion 240 opposite the radial slot 238. The raised projection 246 on the inner spring 236 facilities orientation of the disk springs 234, 236 relative to one another so that each projection is positioned in the radial slot of the adjacent spring. In this manner, the body portion 240 of one disk spring will cover the slot 238 of the other and vice versa, to help prevent saw dust and debris from invading the hinge assembly 98 and to provide a more evenly distributed biasing force. The pivot shaft 114 also includes a pair of annular grooves 247, 248 (FIG. 4) which are simply receiving recesses for lubricating grease.

The disk springs 234, 236 include an outer periphery in fixed abutting relation to the outer surface of one of the pivot shaft support portions 170 and which lies within the annular recess 210. The radially extending ribbed support members 218 provide support to the disk springs 234, 236 about the periphery of the annular recess 210. In this position, the nestable concave disk springs 234, 236 constantly tend to bias the pivot shaft 114 relative to the operating member 110 in one axial direction (shown as arrow 1 in FIG. 6) along the axis 102. The axial length through which the biasing means 226 may be adjusted varies within a range of short, intermediate, and long axial lengths. A shaft stop means 254 (FIGS. 6 and 8) is provided in order to prevent axial movement of the operating member 110 relative to the pivot shaft 114 and to place the biasing means 226 in its intermediate position of axial length. When the stop means is in its installed position, the operating member 110 is prevented from moving in an axial direction away from the optimum operating member position.

In the preferred form of the invention, the stop means 254 includes a shaft stop 258 which is mounted to be in an abutting relation between the pivot shaft 114 and the operating member 110. As best shown in FIG. 2 of the drawings, the shaft stop 258 may comprise a portion of removable cover 86 which is attached to the cutting unit housing 82 by suitable means such as a bolt 262 (also shown in FIGS. 6 and 8). The process of attaching the removable cover 86 (which includes shaft stop 258) to the cutting unit housing causes movement of the pivot shaft in the direction shown by arrow 3 in FIG. 6. This movement is directed against the biasing force of disk springs 234, 236 and forces the springs to an intermediate axial length. The adjustment of the biasing means 226 to its intermediate axial length guarantees that axial wear occurring between the outer disk spring 236 and the annular spring receiving groove 242 of the pivot shaft 114 (arrow 2 in FIG. 4) will cause a variation in the axial length of the biasing means 226 without moving the operating member 110 from its optimum position relative to the pivot shaft 114.

The hinge assembly 98 of the preferred embodiment is assembled in the following manner. The disk springs 234, 236 are slide mounted onto the pivot shaft 114 (packed with an appropriate amount of lubricating grease) in an orientation already discussed. The pivot shaft 114 is then inserted into the bore 178 of the first pivot shaft support portion 170, through the bore 138 in the base member 106 and finally through the bore 182 in the other pivot shaft support portion 174. The periphery 250 of the pair of disk springs 234, 236 is now in contact with ribbed outer support members 218 in the annular recess 210 of the first pivot shaft support portion outer boundary 202. The stop member 258 is then mounted on the outer boundary 202 forcing the pivot shaft 114 to its optimum position relative to the operating member 110. Set screws 150, 154 are then inserted into the set screw receiving bores 142, 146, respectively, and tightened into contact with annular grooves 158, 162 on the pivot shaft 114 thereby securing the pivot shaft 114 in an optimum position relative to the base member 106 and, as a result, securing the base member 106 in an optimum position relative to the operating member 110.

As the saw is lowered from the non-cutting position (FIG. 2) to the cutting position (FIG. 1), *axial* wear resulting from frictional rotation of the functional elements of the hinge 98 will occur primarily at the axial interface of the outer disk spring 236 and the pivot shaft 114 (arrow 2 on FIG. 4). The wear will be accommodated for by movement of the biasing means 226 in the axial direction shown by arrow 1 on FIG. 6. The movement is a result of the biasing force of the disk springs 234, 236 mounted on the shaft 114. In theory, it is also possible for wear to occur at the interface between the stop member 258 and the pivot shaft 114. However, because both surfaces are large in area, flat, and because they move through a relatively short circumferential distance, the frictional wear is negligible.

Various features of the invention are set forth in the following claims.

What is claimed is:

1. A pivot assembly for mounting an operating member on a base member for pivotal movement about an axis at a fixed optimum axial position comprising:
   a pivot shaft having an axis;
   a base member and an operating member having axially opposed first and second inner surface means respectively;
   a first mounting means for mounting one of said members at a fixed axial position on said pivot shaft; and
   a second mounting means for mounting said other member on said pivot shaft for relative rotational movement only in an axially fixed plane which is normal to said pivot shaft axis, and for axial adjusting movement of said other member to a position where said first and second inner surface means axially oppose each other with an axial space therebetween, and said other member is at said optimum axial position in said fixed plane, said second mounting means including;
   a biasing means mounted to be in a biased condition when said other member is at said optimum axial position, which constantly tends to move said other member in one axial direction away from said optimum position; and
   a stop means preventing movement of said other member relative to said pivot shaft in said one axial direction from said optimum position and maintaining said biasing means in said biased condition thereby preventing axial deviation of said other member from said optimum position due to wear induced axial dimensional changes.

2. The pivot assembly according to claim 1 wherein said optimum position of said other member is located so that said axial space between said first and second inner surface means is of a dimension sufficient to allow said relative rotational movement without machining said inner surface means.

3. The pivot assembly according to claim 1 wherein said stop means includes a shaft stop in abutting relation between said pivot shaft and said other member when said other member is in said optimum position.

4. The pivot assembly according to claim 3 wherein: said biasing means is adjustable to have an axial length which varies within a range of short, intermediate and long axial lengths; and said shaft stop, when said other member is in said optimum position, is operative to adjust said biasing means to said intermediate axial length so that axial wear will cause a variation in axial length of said biasing means without moving said other member from said optimum position.

5. The pivot assembly according to claim 1 wherein said biasing means includes a compressible disk spring means mounted in a surrounding axially fixed position on said pivot shaft and having an outer periphery in fixed abutting relation with said other member.

6. The pivot assembly according to claim 5 wherein said disk spring means includes first and second concave disk springs nestable one within the other, each of said disk springs having a radial slot for receiving said pivot shaft therein with said disks angularly positioned to orient said slots in diametrically opposed relation to each other.

7. The pivot assembly according to claim 1 wherein
said other member includes an outer surface means axially spaced from said second inner surface means, a bore extending between said surface means and an annular recess in said outer surface means surrounding said bore said annular recess having a recessed surface;
said pivot shaft has a thrust portion and is mounted in said bore with said thrust portion positioned within said recess;
said biasing means includes an axially compressible spring positioned in said recess and operatively interposed between said pivot shaft thrust portion and said recessed surface; and
said stop means includes a recess cover and a releasable fastening means for causing closing movement of said cover to a fully closed position relative to said recess, said closing movement initially bringing said cover into contact with pivot shaft thrust portion to cause relative axial movement between said other member and pivot shaft which will gradually compress said spring means axially until said cover is in said fully closed position wherein said other member is moved to said optimum position.

8. A pivot assembly according to claim 1 wherein
said other member is bifurcated to include spaced apart pivot shaft support portions having axially aligned bores in which said pivot shaft is rotatably mounted;
said second inner surface means comprises a second inner surface on each of said pivot shaft support portions to provide a base member receiving gap therebetween; and
said base member first inner surface means comprises a pair of outwardly facing spaced apart first surfaces, said base member fixedly secured on said pivot shaft in said gap with each of said outwardly facing spaced apart first surfaces axially spaced from said second inner surfaces in opposing relation a distance sufficient to create an operating clearance that will permit said relative rotation of base and operating member without machining any of said surfaces.

9. A pivot assembly for use in mounting a cutting unit operating member that has a motor driven saw blade, on a base member for pivotal movement about an axis from a non-cutting position to a cutting position placing said blade at an optimum cutting position on said base comprising:
a pivot shaft having an axis;
a base member having a first inner surface means;
a second inner surface means on said cutting unit operating member positionable in axially opposed relation to said first inner surface means;
a first mounting means for mounting said base member at a fixed axial position on said pivot shaft; and
a second mounting means mounting said cutting unit operating member on said pivot shaft for relative rotational movement only in an axially fixed plane which is normal to said pivot shaft axis at said optimum cutting position, and for axial adjustment of said operating member to locate said saw blade at the optimum position with an axial clearance between said first and second surface means sufficient to provide a clearance permitting said relative rotation when said opposed surfaces are in an unmachined condition of manufacture, said second mounting means including
a biasing means interposed between said shaft and cutting unit operating member and adjustable to have an axial length which is variable within a range of short, intermediate and long axial lengths, said biasing means when adjusted to said intermediate axial length, causing said cutting unit operating member saw blade to locate at said optimum cutting position and exert a force tending to move said cutting unit and saw blade in one axial direction away from said optimum cutting position; and
a removable cover mountable at a fixed position on said cutting unit operating member and having a stop portion for automatically adjusting said biasing means to said intermediate length when said blade cover is mounted in said fixed position so that axial wear between said pivot shaft and biasing means will manifest as a change in axial length of said biasing means from said intermediate length without axial deviation of said saw blade from said optimum position.

10. A pivot assembly according to claim 9 wherein
said cutting unit operating member is bifurcated to include spaced apart pivot shaft support portions having axially aligned bores in which said pivot shaft is rotatably mounted;
said second inner surface means comprises a second inner surface on each of said pivot shaft support portions to provide a base member receiving gap therebetween; and
said base member first inner surface means comprises a pair of spaced apart first surfaces, said base member fixedly secured on said pivot shaft in said gap with each of said first surfaces axially spaced from the respective second surface opposed to said respective first surface to create an operating clearance that will permit said relative rotation between said base and cutting unit operating member without machining any of said surfaces.

11. A cutting tool comprising:
a base including a support member;
a support surface on the support member;
a pivot shaft having a longitudinal axis and being supported by the support member so that the pivot shaft is fixed relative to the base and extends transverse to the support surface;
an arm mounted on the pivot shaft for rotation about the longitudinal axis, the arm including an arm surface which faces the support surface in spaced relation;
a cutting unit mounted on the arm such that the cutting unit moves in a fixed plane which extends perpendicular to the axis and which defines an optimum cutting unit operating position;
a spring having an intermediate length of compression and being connected between the pivot shaft and the arm so that the spring biases the arm in a first axial direction relative to the pivot shaft; and a stop member connected to the arm so that the stop member contacts the pivot shaft and provides a counter force to the spring biasing force thereby positioning the spring at the intermediate length of compression and positioning the arm surface in spaced relation to the support surface to establish the optimum cutting tool operating position.

12. A cutting tool according to claim 11 wherein the pivot shaft includes an annular groove and wherein the support member includes a locking member communicating with the groove to secure the pivot shaft relative to the base.

13. A cutting tool according to claim 11, wherein the pivot shaft has an end, and wherein the stop member abuts the end to provide the counter force to the shaft.

14. A cutting tool according to claim 11 wherein the spring comprises a compressible disc spring axially fixed to the pivot shaft and wherein the disc spring includes a periphery in contact with the arm.

15. A cutting tool according to claim 14 wherein the disc spring further comprises first and second concave discs, each having a radial slot for receiving therein the pivot shaft and wherein the first and second concave discs are positioned on the pivot shaft so that the respective radial slots are diametrically opposed to one another.

16. A cutting tool according to claim 11 wherein the support surface and the arm surface are not machined.

* * * * *